June 7, 1932.     G. M. BELLANCA     1,861,901
STRUT CONSTRUCTION
Filed Nov 8, 1930
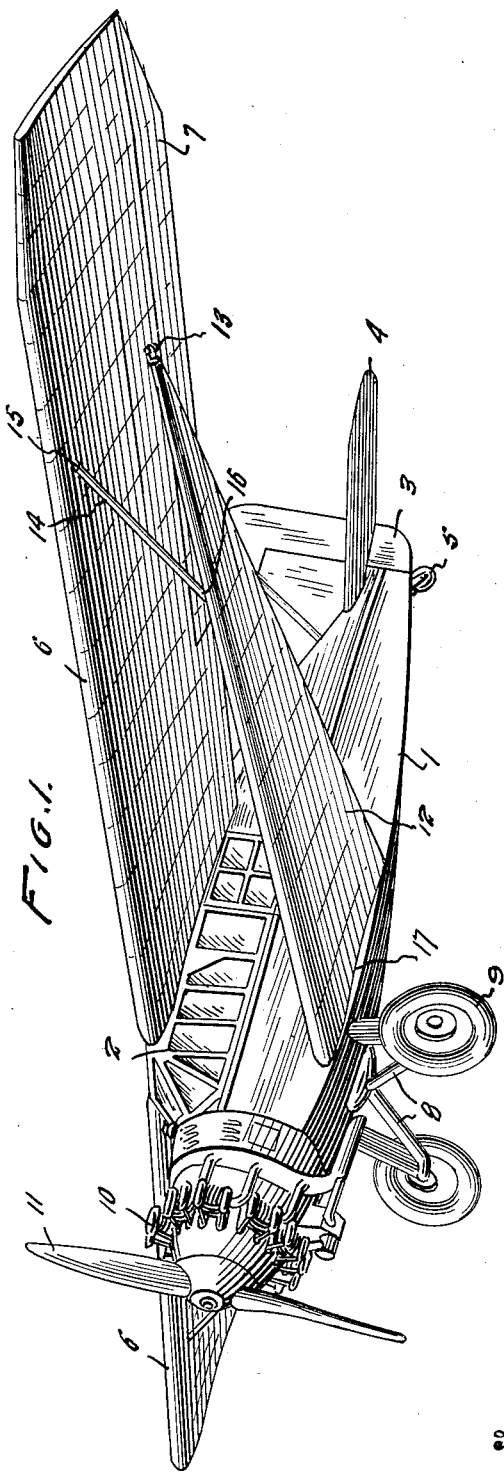
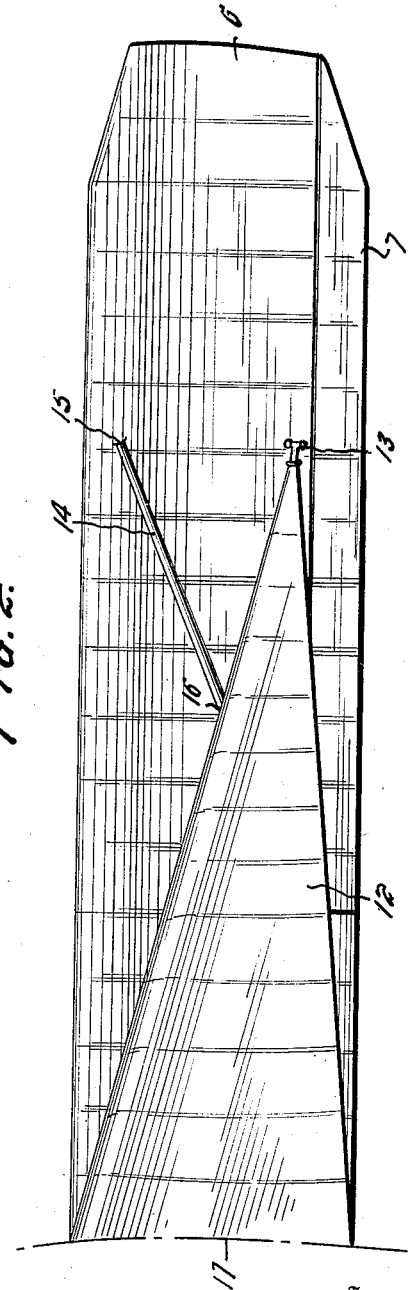
Inventor
GIUSEPPE M. BELLANCA
By Semmes & Semmes
Attorneys Patented June 7, 1932

1,861,901

UNITED STATES PATENT OFFICE

GIUSEPPE M. BELLANCA, OF NEW CASTLE, DELAWARE

STRUT CONSTRUCTION

Application filed November 8, 1930. Serial No. 494,360.

This invention relates in general to airplanes and more particularly has reference to a novel wing supporting structure therefor.

In the past it has been customary to provide angularly arranged struts to support the outer portions of the wings from the body of the airplane. Obviously these struts or supporting members have added considerable weight and air resistance to airplane structures in the past. The air resistance has partially been eliminated by stream lining the various parts. However, the wing supporting parts have in the past served no useful purpose except for their function in supporting the wings, but have only been a source of dead weight while the plane was in the air. It is therefore, quite evident that any such strut which might be provided and which would serve some additional useful purpose would be highly desirable.

To overcome the above and other disadvantages of prior construction in wing struts is one of the objects of this invention.

Another object of this invention is to provide a strut for supporting the main wing of an airplane which strut will assist in the operation of the plane in the air.

Yet another object of this invention is to provide an airplane with a strut which will substantially increase the lifting surface of the airplane.

Still another object of this invention is to provide a strut for an airplane wing which strut is formed as an airfoil.

Yet another object of this invention is to provide an airfoil strut for supporting an airplane wing, said strut being of such shape that the breadth of its lifting surface decreases as it approaches the surface of the main wing.

Another object of this invention is to provide a wing supporting strut which will offer the least possible air resistance and which will assist in sustaining the plane in its flight.

To accomplish the above and other important objects, this invention comprehends a means whereby the main wing of an airplane is supported and assisted in its function of supporting the weight of the airplane while in flight.

To insure an adequate comprehension of the invention and wishing it to be distinctly understood that various modifications may be made in the preferred embodiment herein shown and described without departing from the spirit and scope of the invention, reference is made to the accompanying drawing in which similar numerals indicate corresponding parts.

Figure 1 is a perspective view of an airplane of the cabin monoplane type showing the improved wing support attached thereto.

Figure 2 is a plan view of the inverted left wing of the airplane shown in Figure 1.

Referring more particularly to the drawing, there is shown in Figure 1 an airplane having a fuselage 1 in which are provided a cabin 2 for the purpose of carrying passengers. At the rear of the fuselage the conventional rudder structure 3 and elevator structure 4 are provided. There is also provided the conventional tail supporting landing wheel 5.

Extending from the sides of the fuselage adjacent the top thereof are the main wings 6 of the airplane. These wings are provided in the conventional manner with ailerons 7. As a supporting means for the outer part of each of these wings there is provided instead of the usual strut members, a triangular strut member of airfoil section which will be hereinafter more fully described.

Attached to the bottom of the fuselage by the conventional landing gear 8 are the landing wheels 9 for supporting the airplane while resting upon the ground. At the forward end of the fuselage there is mounted the engine 10 for driving the plane through the medium of the propeller 11.

For the purpose of supporting the outer portion of the wing and for the purpose of securing other advantages which will hereinafter appear there is provided a triangular lift strut member 12 attached at its vertex to the under side of the main wing adjacent its trailing edge through the medium of the fixture 13. Also attached to the under side of the wing but adjacent its leading edge there is shown an auxiliary bracing member 14. This bracing member is shown attached to the lower surface of the wing 6 as at 15 and to the leading edge of the triangular strut 12 at the point 16. The point 16 may be located at any point within a short distance below the attachment of the strut member to the main wing. The base of this triangular strut is secured to the lower portion of the airplane body immediately below the attachment of the main wing thereto as at 17. Preferably this attachment is continuous throughout the extent of the base portion of the triangular strut member.

The operation of the improved wing strut described above is very advantageous. First of all it will be noted that practically the entire member is provided with a lifting surface and will assist the main wing 6 in supporting the weight of the airplane.

It will be further noted that due to the fact that the wing strut is in the form of a triangle having its base portion secured through its extent to the fuselage, it will offer a very strong resistance to any tendency to move it forward or backward.

It will further be noted that the main wing, the strut member, and the fuselage of the airplane form a rigid triangle which would effectively resist any forces tending to move one with respect to the other.

It is further noted that although the strut itself has only one point of attachment to the lower surface of the main wing, there is provided the auxiliary member 14 which serves as another attachment between the strut and the main wing and prevents any relative movement of these parts in a forward or rearward direction.

In the present illustration the strut is shown as having substantially the same angle of incidence as the main wing. However, it must be understood that this angle for the strut may be either greater or less than that of the main wing and may be even made negative under certain conditions.

It is also noted that means may be provided for allowing an adjustment of the angle of incidence of the strut at the will of the pilot.

From the foregoing it will appear that there has been provided a wing supporting structure which offers a minimum of air resistance and a maximum of strength.

It will also appear that there has been provided a strut of the type described which will not merely be dead weight when the airplane is in the air, but which will assist the wings of the airplane in their supporting function.

It is to be noted that this apparatus is not limited in its use to airplanes of the monoplane type or to airplanes of the cabin type, but may be employed on other types of airplanes as well with only slight modifications.

It is further to be noted that the sustaining surfaces which are furnished by the strut members 12 not only assist in sustaining the weight of the airplane but because of their sloping disposition, they very materially increase the lateral stability of the airplane.

It will be appreciated as above pointed out that various modifications may be made in the apparatus herein disclosed and described without exceeding the scope of the invention as defined in the appended claim, it being distinctly understood that the prior art and the claim alone are to be definitive of the invention.

I claim:

In an airplane, a wing supporting strut having a triangular lifting surface of airfoil section, the base of the triangle being secured to the fuselage, and the vertex of the triangle being secured to the wing adjacent its trailing edge, and an auxiliary bracing member secured at one end to the leading edge of said strut at a point below the vertex of the triangle, and at its other end to the leading edge of said wing.

In testimony whereof I affix my signature.

GIUSEPPE M. BELLANCA.